US010375471B2

(12) United States Patent
Johnson et al.

(10) Patent No.: US 10,375,471 B2
(45) Date of Patent: Aug. 6, 2019

(54) VOICE CONTROLLED ASSISTANT

(71) Applicant: Amazon Technologies, Inc., Seattle, WA (US)

(72) Inventors: Kelly Erin Johnson, Menlo Park, CA (US); Christopher Mann Chamberlin, Austin, TX (US); Aashish Nataraja, Santa Clara, CA (US); Duane Everard Whyte, San Jose, CA (US); Alexandra Hall Hoster, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 15/691,383

(22) Filed: Aug. 30, 2017

(65) Prior Publication Data

US 2019/0069078 A1 Feb. 28, 2019

(51) Int. Cl.
*H04R 1/34* (2006.01)
*H04R 1/02* (2006.01)
*H04R 3/12* (2006.01)
*G06F 3/16* (2006.01)
*H04R 1/08* (2006.01)

(52) U.S. Cl.
CPC ............ *H04R 1/345* (2013.01); *G06F 3/167* (2013.01); *H04R 1/023* (2013.01); *H04R 1/025* (2013.01); *H04R 1/086* (2013.01); *H04R 3/12* (2013.01); *G06F 3/165* (2013.01)

(58) Field of Classification Search
CPC .......... H04R 3/12; H04R 1/025; H04R 1/345; H04R 1/023; H04R 1/086; G06F 3/167; G06F 3/165

USPC ........................................................ 381/335
See application file for complete search history.

(56) References Cited

U.S. PATENT DOCUMENTS 9,574,762 B1   2/2017 Grillo et al.
9,721,586 B1   8/2017 Bay et al.
2016/0345086 A1* 11/2016 Chamberlin ........... H04R 1/028

OTHER PUBLICATIONS

CNET, "How to customize your Google Home's appearance", Jan. 10, 2017, Retrieved from the Internet: URL:https://www.youtube.com/watch?v=L4PHtclRVak[retrieved on Nov. 28, 2018], 1 page.
The PCT Search Report and Written Opinion dated Feb. 8, 2019 for PCT Application No. PCT/US2018/048595, 16 pages.

* cited by examiner

*Primary Examiner* — Paul Kim
(74) *Attorney, Agent, or Firm* — Lee & Hayes, P.C.

(57) ABSTRACT

An apparatus including a housing and a sleeve that engages and at least partially encloses the housing. The housing may include a top portion having a loudspeaker and an exterior surface and a bottom portion having a loudspeaker and an exterior surface. An audio diffuser may be positioned between the top portion of the housing and the bottom portion of the housing so as to radially disperse sound from the loudspeakers. A light ring on the housing may indicate a functional state of the apparatus. Protrusions on the housing may interact with indentations on the sleeve to position and align the housing within the sleeve. The sleeve may include holes to allow sound to be outputted from the loudspeakers. Magnets and alignment elements may further situate and secure the housing to the sleeve.

20 Claims, 8 Drawing Sheets

VOICE CONTROLLED ASSISTANT

BACKGROUND

Homes are becoming more connected with the proliferation of computing devices, such as desktop and laptop computers, tablets, entertainment systems, and portable communication devices. As these computing devices continue to evolve, many different ways have been introduced to allow users to interact with the computing devices, such as through touch, gestures, and speech. With speech interaction, the devices may be operated essentially "hands free."

To implement speech interaction, devices are commonly equipped with a microphone to receive voice input from a user and a speech recognition component to recognize and understand the voice input. Devices also commonly include a speaker to emit audible responses to the user. However, many existing devices have limited sound output and/or non-uniform sound distribution.

Also, devices typically have a standard or uniform appearance, offering little to no customization. However, with the rise of voice controlled devices, consumers may seek to customize an appearance of their device.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
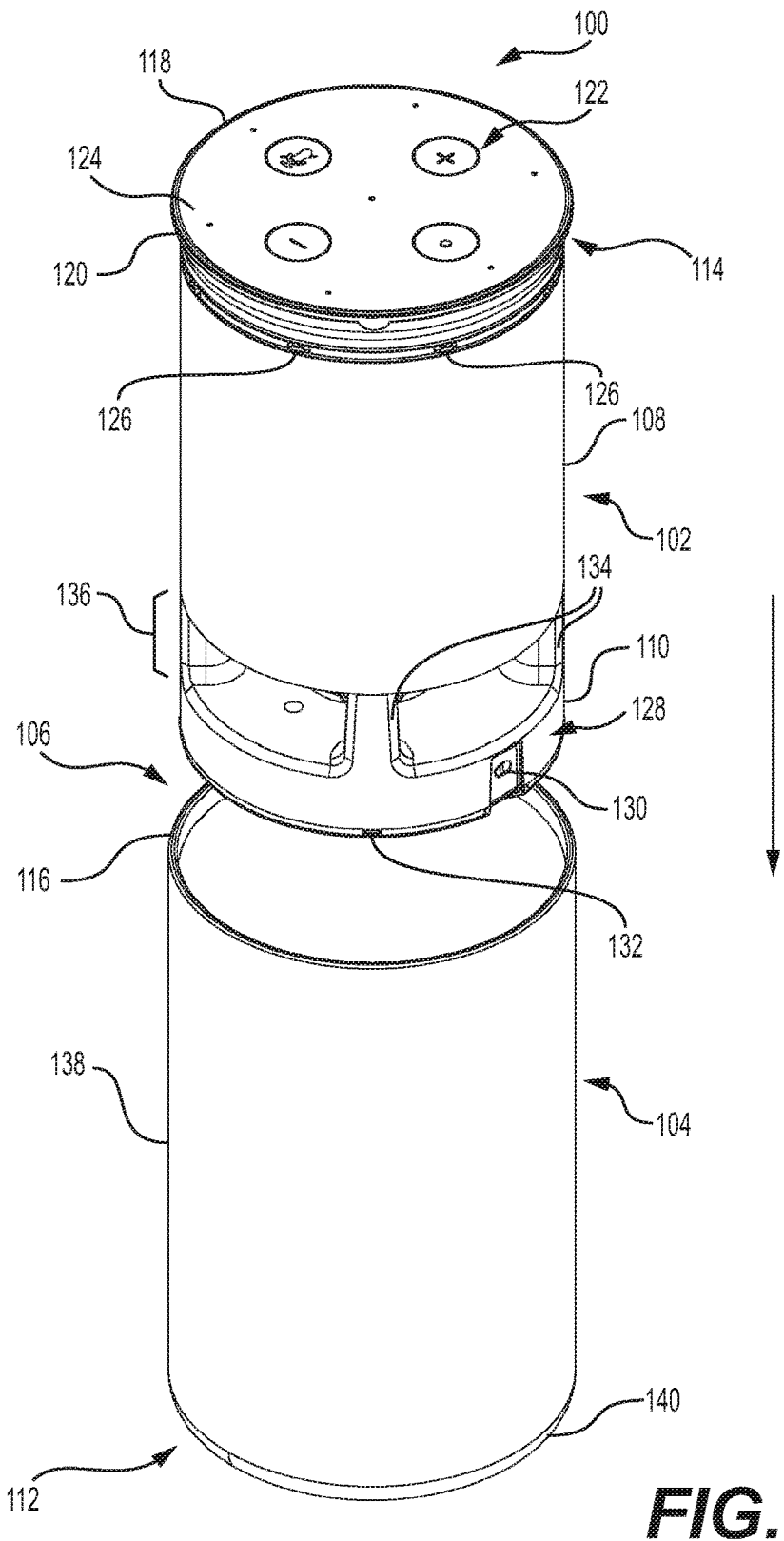
FIG. 1 illustrates an exploded perspective view of an example voice controlled assistant, showing a housing that slides into a sleeve.

As discussed above, existing computing devices may provide limited opportunities to customize a look or feel of a voice controlled assistant. This limitation may detract from an aesthetic appearance of the assistant or the assistant may not fit with a style of a room in which the assistant is to be placed. For instance, depending on the setting, consumers may wish to alter an appearance of the device. Additionally, consumers may want an appearance of the device to change depending on certain events, such as Christmas or a birthday.

This application is directed to a voice controlled assistant having customizable appearance. Voice controlled assistants according to this application may have a housing designed to fit within multiple different interchangeable sleeves. In some examples, the housing may engage with or rest within a sleeve through sliding the housing down into the sleeve. When assembled, the housing may be engaged flush with the sleeve so as to provide a smooth aesthetic appearance. In other words, the housing may slide into the sleeve until the sleeve abuts a lip or flange protruding radially outward from a top of the housing.

In some instances, the housing may have protrusions that help guide the housing into the sleeve. The protrusions may offer resistance (i.e., friction) when the housing is slid into the sleeve, so as to prevent damage to the voice controlled assistant. More particularly, the protrusions may guide the housing into place within the sleeve by sliding against and providing resistance against a sidewall or surface of the sleeve. Moreover, as the protrusions guide the housing down into the sleeve, the protrusions may help prevent a user's fingers from becoming pinched between the sidewall and the housing.

To seat the housing within the sleeve, the protrusions may engage with indentations or recesses on an inside surface of the sleeve facing the housing. The interaction between the protrusions and indentations may situate the housing within the sleeve. For instance, the when the protrusions are engaged with the indentations, the housing may be centered within the sleeve. In addition, the protrusions may help retain the housing within the sleeve. That is, the interplay between the protrusions and indentations may keep the housing from disconnecting or sliding out of the sleeve, for instance (e.g., when the device is picked up). The protrusions may also dampen or absorb vibrations from the housing and prevent the sleeve from rattling during use.

In some examples, to position the housing within the sleeve, alignment elements may be disposed on the housing and the sleeve. For instance, when the housing is slid into the sleeve, the alignment elements may serve to properly align the housing with/within the sleeve. This alignment may assure that input/output ports (e.g., a power connection, auxiliary port, headphone jack, USB port, etc.) are properly aligned with a corresponding opening in the sleeve prior to and during insertion. In addition, the alignment elements may help prevent the housing from rotating within the sleeve.

In some examples, to secure the housing to the sleeve, the sleeve and housing may additionally or alternatively include magnetic elements. The magnetic elements may be positioned on a bottom surface of the housing and a surface of the sleeve in contact with the bottom surface of the housing. In some examples, the magnetic elements may reside within the alignment elements. The magnetic elements, when engaged, may provide an indication that the housing is properly aligned with the sleeve. In some instances, the magnetic elements may include a permanent magnet, an electromagnet, or a ferrous metal.

A voice controlled assistant according to this application may comprise a housing that includes a top portion and a bottom portion. Legs, or columns, may adjoin the top portion and the bottom portion. Legs may extend from the top portion, the bottom portion, or may be separate inserts. The legs may create a gap between the top portion and the bottom portion of the housing. The gap between the top portion and the bottom portion may assist in outputting sound emitted by loudspeakers residing within the top portion and/or the bottom portion.

The top portion may include audio input/output components configured to receive audio input and to provide audio output. To accomplish the functions of the voice controlled assistant, and the audio input/output processing, the top portion may include internal components such as loudspeakers, light emitting diodes (LEDs), printed circuit boards (PCBs), or other hardware. The internal components may be used in conjunction with a network-based speech support service server to implement a speech interface and to perform commands.

In some examples, voice controlled assistants may have buttons and input and/or output ports. In some examples, the buttons may correspond to a power button, a wireless connectivity button, a mute button, volume buttons, sync buttons, or any other type of button or control. The buttons may be mechanical (e.g., having physically movable components) and/or electronic (e.g., capacitive sensors, optical sensors, touch screen, or the like). A wireless transceiver may be included and configured for communication with other devices, such as mobile phones, tablets, computers, other portable audio input/output devices, and/or any other computing device capable of wireless communication.

In some instances, the voice controlled assistant may have a talk button that is pressed when a user speaks a command. While the talk button is pressed, the voice assistant device may capture user audio and provide the user audio to a speech support service server. The speech support service server may perform automatic speech recognition (ASR) and natural language understanding (NLU) to determine a user's command. Upon identifying the user's command, the voice controlled assistant may output a response, cause actions to be performed (e.g., playing music or ordering movie tickets), or elicit feedback from the user.

In some examples, the voice controlled assistant may have a visual indicator(s) located on a surface or around at least a portion of a perimeter of the housing. The visual indicator may, in some instances, comprise a light ring positioned on or around the top portion of the housing. The visual indicator may be illuminated by one or more light sources, such as LEDs, located within the housing. A light guide within the housing may redirect light from the LEDs to the light ring or other visual indicator(s). The visual indicator(s) may indicate various information to a user, such as to provide visual feedback regarding a task or operation being performed by the voice controlled assistant.

The bottom portion of the housing may include LEDs, PCBs, loudspeakers, input and/or output ports including universal serial bus (USB) ports, audio jacks, video jacks, as well as an external power connection. In some instances, the bottom portion may have a rechargeable battery, enabling the voice controlled assistant to operate without connection to an external power source. However, the voice controlled assistant may also be used with a power cord that provides external electrical power to the battery for recharging, while also providing power to the voice controlled assistant.

As briefly indicated above, a bottom cover or surface of the bottom portion may have alignment elements or magnetic elements that position, secure, situate, or otherwise align the housing within the sleeve.

To disperse sound produced by the voice controlled assistant, an audio diffuser may be interposed between the top portion and the bottom portion of the housing. In some instances, loudspeakers maintained in the top portion and bottom portion may be directed towards the audio diffuser. To illustrate, a loudspeaker residing within the top portion of the housing may be directed towards the bottom portion, while the loudspeaker within the bottom portion of the housing may be directed toward the top portion. That is to say, a first loudspeaker may fire in a first direction while a second loudspeaker fires in a second direction that is opposite or dissimilar as the first direction. In such embodiments, when the loudspeakers are firing (i.e., outputting sound), the audio diffuser may radially disperse sound outward, away from the voice controlled assistant.

The sleeve may have openings extending partially or completely through a thickness of the sleeve. The openings may help to disperse sound away from the voice controlled assistant. In some instances, the openings may be located around a circumference of the sleeve adjacent to the audio diffuser.

The sleeve may include a grill that surrounds at least a portion of an exterior surface of the sleeve. In some examples, an appearance of the voice controlled assistant may be modified through interchanging the grill. For instance, in a setting that includes wood furniture, accents, molding, etc., the voice controlled assistant may have a grill that includes a wood-grained exterior finish. In other instances, such as in a kitchen with stainless steel appliances, a grill with a brushed-metal exterior finish may be more appealing. In other instances, the grill may be a woven or non-woven fabric or mesh material. Yet still, during holidays, the grill may include Christmas memorabilia. Material of the grill may be seamless, so as to create a smooth aesthetic appearance. However, in some instances, the appearance of the voice controlled assistant may be modified through replacing the entire sleeve.

An opening within a base end of the sleeve may engage a plug, or foot, disposed on the bottom portion of the housing. That is, the plug of the housing may protrude at least partially through the opening in the bottom of the sleeve. During use, a user may separate the housing from the sleeve by holding the sleeve and pushing upward on the plug to press the housing from the sleeve. The pushing may separate the magnetic elements in the housing from the corresponding magnetic elements in the sleeve and dislodge the protrusions on the outer circumference of the housing from the recesses on the inner surface of the sleeve. As the housing is pressed from the sleeve, the flange or lip around the top portion of the housing is separated from a rim of the sleeve, thereby allowing a user to grasp the flange or lip at the top of the housing and pull it from the sleeve. In some instances, the plug may also center the housing within the sleeve when installed.

FIG. 1 is a perspective view of an example voice controlled assistant 100. The voice controlled assistant 100 may include a substantially cylindrical housing 102, that is engaged within a sleeve 104. In some instances, the housing 102 may slide into the sleeve 104 through an open end 106 at the top of the sleeve 104. The housing 102 may be embodied as a single feature or may include a top portion 108 and a bottom portion 110. When engaged with the sleeve 104, an exterior surface of the housing 102, such as an exterior surface of the bottom portion 110, may contact an interior surface of a base end 112 of the sleeve 104. When inserted, a flange or lip 114 on the top portion 108 of the housing 102 may rest on an annulus 116 surrounding the open end 106 of the sleeve 104, so as to create a seamless appearance on an exterior of the voice controlled assistant 100. In some instance, the lip 114 may comprise a top cover 118 and/or a light ring 120.

In some examples, the top portion 108 may be hollow and may include the top cover 118. The top cover 118 may have buttons 122 or other controls, such as volume buttons, a mute button, play control buttons, a talk button, etc. Generally, the talk button may be referred to as a talk actuator or a push-to-talk (PTT) button. In some examples, a user may press the talk button when speaking a request for the voice controlled assistant 100 to perform. In some examples, the user may indicate a request by prefacing the request with a predefined keyword, such as a wakeword or trigger expression, with or without actuating the talk button. The buttons 122 may be configured to have caps or contacts placed over them with symbols visually indicating their associated function.

In some examples, microphone ports 124 may be located through the top cover 118. The microphone ports 124 may direct sound or allow sound to pass to one or more microphones (not shown in this figure) included within the top portion 108. That is, the microphones may receive audio, for instance, user speech, via the microphone ports 124 placed throughout the top portion 108 or the top cover 118. In some examples, the microphones may be selected and/or designed for sensitivity to near-field audio, so as to adjust audio captured based on which microphones are closest to the user.

As mentioned above, the voice controlled assistant 100 may be configured to capture and respond to user speech. Speech processing, such as automatic speech recognition (ASR), natural language understanding (NLU), and speech synthesis may also be performed. In some instances, a user may verbally request the voice controlled assistant 100 to perform a particular task, such as to play music. The user speech may be analyzed and interpreted to identify particular music or other audio content that the user has requested to play. The voice controlled assistant 100 may respond to the request by playing the music. In some instances, content identified in this manner is played through loudspeakers of the voice controlled assistant 100. However, the voice controlled assistant 100 may also be configured to provide the content to available peripheral devices such as Bluetooth loudspeakers or other peripherals that are nearby or in wired or wireless communication with the voice controlled assistant 100. For example, in some instances, the voice controlled assistant 100 may be configured to play music using a home audio system. In other examples, the voice controlled assistant 100 may be configured to synchronize with other voice controlled assistant(s) (e.g., in other rooms or locations).

In some examples, components of the top portion 108, such as the microphones, may be acoustically sealed to prevent acoustic signals from interfering with those being received via other portions of the voice controlled assistant 100. For example, various sounds associated with the click of the buttons 122 may be minimized and acoustically isolated from the microphones.

The light ring 120 may be disposed around an exterior of the housing 102 and may be interposed between the lip 114 and the annulus 116 when the housing 102 is inserted into the sleeve 104. Therefore, when the voice controlled assistant 100 is assembled (i.e., inserting the housing 102 into the sleeve 104), the light ring 120 may be sandwiched between the annulus 116 of the sleeve 104 and the lip 114 of the housing 102. The light ring 120 may provide a visual indicator usable to output one or more states of the voice controlled assistant 100 (e.g., listening, receiving instruction, processing, volume, etc.). In some examples, the light ring 120 may be illuminated by one or more light sources residing within the housing 102, which is discussed in more detail with reference to FIG. 2. The one or more light sources illuminating the light ring 120 may be illuminated statically (e.g., one or more light sources illuminated continuously) or dynamically (e.g., one or more light sources flashing simultaneously, illuminating the light sources sequentially, alternating which visual indicators are illuminated, etc.). The light ring 120 may take a wide range of visual appearances by varying which segments are on/off, the respective colors of the segments, and the timing of activating the segments. Additional details of the top portion 108, including internal components, are discussed with reference to FIGS. 2 and 3.

The top portion 108 of the housing 102 may also include protrusions 126 on an exterior surface thereof. In some instances, the protrusions 126 may encircle a perimeter of the top portion 108. The protrusions 126 may be embodied as a band that resides within a channel about the top portion 108 or, alternatively, may be individually placed pills or nubs. As briefly indicated above, the protrusions 126 may assist in guiding the housing 102 into the sleeve 104 so as to prevent damage from occurring to the voice controlled assistant 100. That is, the protrusions 126 may offer resistance between the housing 102 and an interior surface of the sleeve 104. In some examples, dimples or indentations (not shown) may be formed on the interior surface of the sleeve 104 and may be complimentary (e.g., sized and shaped) to engage with the protrusions 126. In other examples, the dimples or indentations may be omitted. Also, while the illustrated examples show the protrusions 126 on the housing 102, in other examples the protrusions 126 could be located on the interior surface of the sleeve 102 and complimentary dimples or indentations may or may not be disposed on the exterior surface of the housing 102. The protrusions 126 may be manufactured from a plurality of materials, including, for example, polymers, rubbers, foams, or thermal plastic elastomers (PCEs).

The bottom portion 110 may include alignment elements 128 such as ribs, tabs, protrusions, slots, indentations, raised platforms, keys, keyways, etc. The alignment elements 128 may assist in situating and retaining the housing 102 within the sleeve 104. In some instances, the alignment elements 128 may be located on the bottom portion 110 of the housing 102 and may engage, rest, or interact with corresponding alignment elements on an interior surface of the sleeve 104 contacting the bottom portion 110. For instance, and as shown in FIG. 1, the alignment elements 128 in this example resemble a channel formed into an exterior surface of the bottom portion 110. In some instances, the alignment elements 128 may extend along an exterior surface of the bottom portion 110 and/or a sidewall of the exterior surface of the bottom portion 110, resembling an "L" shaped groove.

As shown in the example of FIG. 1, the bottom portion 110 of housing 102 may have the alignment elements 128 resembling a through or groove. To mate or otherwise engage with the alignment elements 128, the sleeve 104 may have an associated extruded alignment element(s) that mirrors an outline of the alignment elements 128. This way, when the housing 102 is placed into the sleeve 104, the alignment elements 128 will pair with the other alignment element(s). While this example has been discussed with regards to a single pair of alignment elements, any number of one or more alignment elements may be incorporated, each having different or similar shapes and appearances. In addition, the alignment elements 128 may extend or be included on an exterior surface of the top portion 108.

When the alignment elements 128 are engaged with their corresponding sets, the interaction may prevent the housing 102 from rotating within the sleeve 104. Moreover, the alignment elements 128 may align I/O ports on the housing 102 (e.g., power port) with corresponding ports or openings in the sleeve 104.

In some instances, a notch, pocket, recess, depression, or other indentation 130 may be disposed within the alignment elements 128. The indentation 130 may interact or engage with a corresponding protrusion (not shown in this figure) located on an interior surface of the sleeve 104 adjacent to the indentation 130.

Similar to the top portion 108, the bottom portion 110 of housing 102 may include protrusions 132 that encircle a perimeter of bottom portion 110. In some instances, rather than the bottom portion 110 having the protrusions 132, the bottom portion 110 may have indentions that engage with corresponding protrusions on an interior surface of the sleeve 104. However, in some instances, the bottom portion 110 may not include the protrusions 132 and/or indentations. Additionally, as alluded to previously and although not shown in FIG. 1, the bottom portion 110 may have contacts, charging ports to power internal components of the housing 102 (e.g., a USB port, AC power port, etc.). As mentioned above, in some examples, the voice controlled assistant 100 may be mains powered, while in other examples the voice controlled assistant 100 may include a rechargeable internal battery for cordless operation.

The top portion 108 and the bottom portion 110 may be separated by a plurality of legs 134 (columns, spacers, inserts, etc.) disposed around a perimeter of the exterior surface of the top portion 108 and the exterior surface of the bottom portion 110. Stated another way, the plurality of legs 134 may span a distance between the top portion 108 and the bottom portion 110. In some instances, the plurality of legs 134 may connect or otherwise adjoin the top portion 108 with the bottom portion 110 of the housing 102 at multiple locations around exterior surfaces thereof.

The plurality of legs 134 may form a gap 136 interposed between the top portion 108 and the bottom portion 110. The gap 136 may create space in which an audio diffuser resides (not shown). The audio diffuser may assist in radially dispersing sound emitted by loudspeakers within the housing 102, away from the voice controlled assistant 100. In some instances, and as discussed and shown later, loudspeakers may be disposed within the top portion 108 and the bottom portion 110, respectively.

Referring now to details of the sleeve 104, in some examples, the sleeve 104 may comprise a substantially cylindrical shape that is sized to encircle or otherwise encase the housing 102. As noted above, the sleeve 104 may include the open end 106 through which the housing 102 is inserted, and the base end 112 on which the housing 102 rests. A grill 138 may partially or completely surround an exterior surface of the sleeve 104. In some instances, the sleeve 104 and/or the grill 138 may be interchanged or swapped out depending on a desired appearance of the voice controlled assistant 100. In other examples, the size, shape, and/or configuration of the sleeve 104 may be different than that illustrated. For instance, the sleeve may have a substantially square or rectangular cross section, an ovoid cross section, a hexagonal or octagonal cross section, the sleeve may extend only a portion (i.e., less than all) of a height of the housing 102, the sleeve may cover only a portion of an exterior surface of the housing 102 (e.g., one or more portions of the housing 102 may be exposed and not covered by the sleeve), etc.

In addition, as mentioned above, surfaces of the sleeve 104 in contact or adjacent to the housing 102 (e.g., the bottom portion 110) may have alignment element(s) (not shown) to engage with the alignment elements 128 on the housing 102. For instance, by way of an additional example, first alignment elements may be disposed on a bottom cover and/or exterior surface of the bottom portion 110. Second alignment elements may be located on an interior surface of the base end 112 of the sleeve 104, so as to engage and interact with the first alignment elements. The first and second alignment elements may also be disposed on an interior surface of the sleeve 104 in contact with the housing 102 and/or an exterior surface of the housing 102 in contact with the sleeve 104.

As mentioned above, the top portion 108 and the bottom portion 110 may have the protrusions 126 and 132, respectively. The protrusions 126, 132 may occupy or otherwise engage indentations (not shown) on an interior surface of the sleeve 104. The indentations may be disposed around an interior perimeter of the sleeve 104 and may be configured to receive the corresponding protrusions 126, 132 on the top portion 108 and the bottom portion 110. That is, to further illustrate, the protrusions 126, 132 may rest within the indentations when the housing 102 is inserted into the sleeve 104. As such, the indentations, through their interaction with the protrusions 126, 132, may help retain and situate the housing 102 within/in the sleeve 104. In addition, the indentations may help the protrusions 126, 132 retain their shape by providing an inlet for the protrusions 126, 132 to erect when the housing 102 is inserted into the sleeve 104.

The base end 112 of the sleeve 104 may have a base cover 140 enclosing the base end 112. As will be discussed in more detail herein, the base end 112 and/or the base cover 140 may have an opening disposed therethrough (not shown). The opening may fit a plug located on the bottom portion 110 or a bottom cover of the bottom portion 110 of the housing 102. The opening may provide accessibility to the plug such that when pushed, the housing 102 may be separated from the sleeve 104. The base cover 140 may have rounded, smoothed, or chamfered edges.

Figure 2:
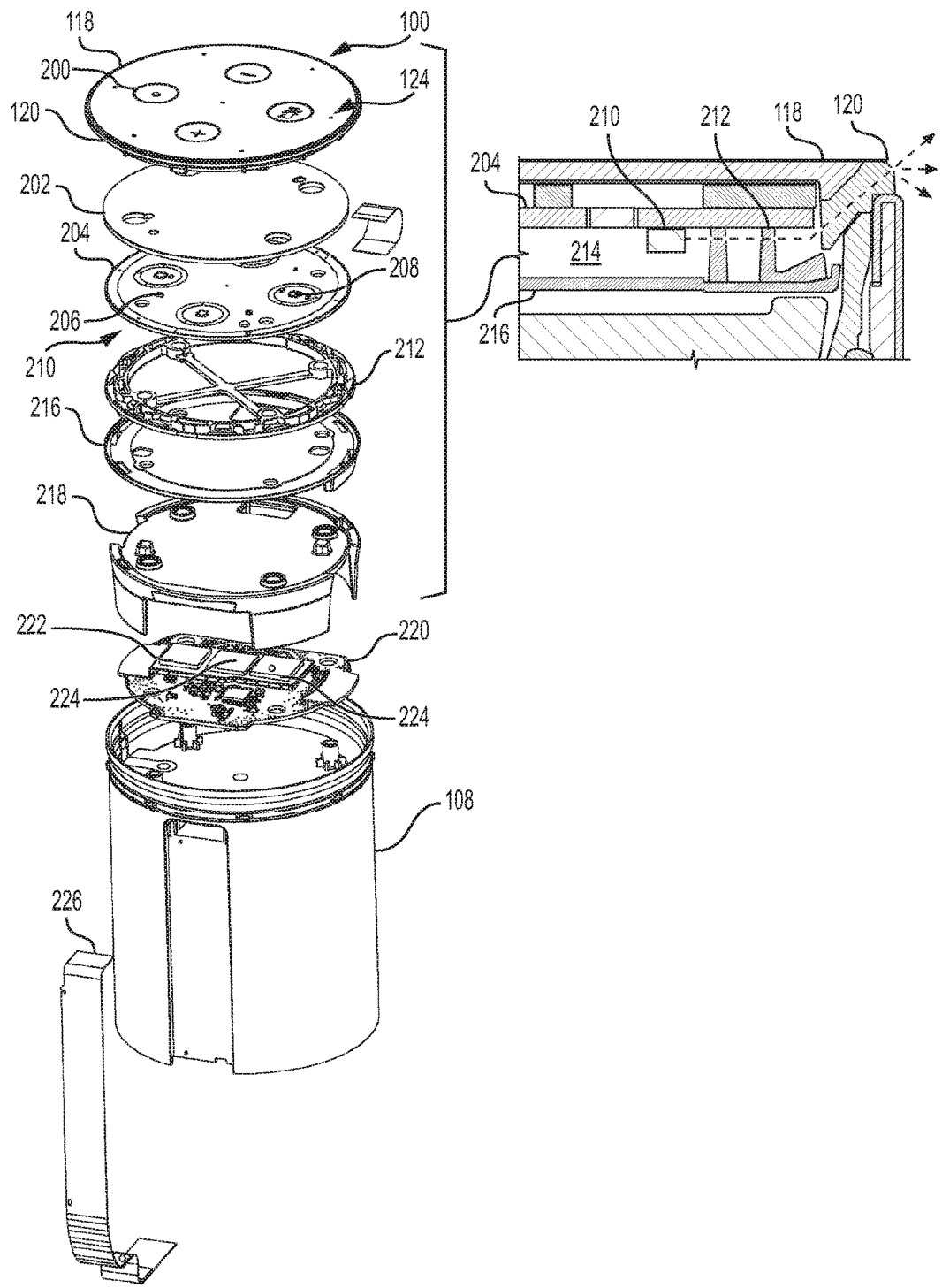
FIG. 2 illustrates a partial exploded view of an example voice controlled assistant, showing internal components residing within a top portion of a housing.

FIG. 2 illustrates a perspective view of the voice controlled assistant 100, showing a partially exploded top portion 108 of the housing 102. FIG. 2 shows details of an assembly of parts beneath the top cover 118 of the top portion 108. In some examples, the top cover 118 may have button covers 200 or other controls.

Positioned beneath the top cover 118 may be the light ring 120 and a foam substrate 202. The foam substrate 202 may acoustically seal one or more microphones beneath the top cover 118. A printed circuit board (PCB) 204 may reside beneath the foam substrate 202 and may include computing components such as any number of processors, memory, circuits, transformers, power supplies, network interfaces, and so forth. When present, the memory may store one or more software modules or instructions that, when executed by one or more processors, configure the voice controlled assistant 100 to perform various operations. In addition, in some examples, the PCB 204 may have one or more microphones 206. In some instances, to permit acoustic signals to reach the microphone(s) 206, the microphone(s) 206 may be aligned or disposed beneath microphone ports 124 extending through the top cover 118 and/or the foam substrate 202.

The PCB 204 may also have buttons 208 that engage with or interact with the button covers 200 on the top cover 118.

An underneath side of the PCB 208 (not shown) may have one or more light emitting diodes LEDs 210 or other light sources.

The LEDs 210 may be designed to emit light towards a light guide 212 positioned adjacent to the underneath side of PCB 204, so as to face the LEDs 210. The light guide 212 may redirect light from the LEDs 210 towards the light ring 120 positioned next to or connected with the top cover 118. In some instance, the light ring 120 may resemble a collar that surrounds a perimeter of the top cover 118. In other instances, the light ring 120 may be positioned beneath the top cover 118, adjacent to a lip or rim thereof.

The light guide 212 may comprise any type of light diffuser that redirects light from the LEDs 210 towards the light ring 120. In operation, light from the LEDs 210 may be emitted towards the light guide 212 and may bounce around, reflect, or refract within the light guide 212, so as to emit at various angles from the light guide 212. In some instances, the light guide 212 may comprise a milky or translucent material, such as polycarbonate, that causes the light to disperse at various angles resulting in a substantially uniform dispersion of light.

FIG. 2 also includes a partial cross-sectional view of a close-up of the top cover 118, the light ring 120, LEDs 210, and the light guide 212. The LEDs 210 may emit light within an interior portion 214, between a shroud 216 and the PCB 204. The light may enter the light guide 212 through openings facing the interior portion 214. After traversing the light guide 212, the light may pass through the light ring 120 and be emitted (shown by broken line).

The shroud 216 may be located beneath the light guide 212 and may block light from shining downward into the top portion 108. In some instances, the shroud 216 may be a light reflective or light-blocking material.

A heatsink 218 may be included to expel heat from a generating source. For instance, the heatsink 218 may disperse heat from the LEDs 210, processors, or other internal components within the top portion 108.

Located beneath the heatsink 218 may be an additional printed circuit board (PCB) 220. The PCB 220 may include similar or different components than those mentioned hereinabove with regard to the PCB 204. Generally, the PCB 220 may comprise any type of printed circuit board that mechanically supports and electrically connects one or more components of the voice controlled assistant 100. For instance, the PCB 220 may connect electronic components using conductive paths etched from a conductive substrate (e.g., copper) that has been laminated, or printed, onto a non-conductive substrate, such as plastic.

In some instances, the PCB 220 may carry out processing of the microphones 206, the buttons 208, the LEDs 210, or other components of the voice controlled assistant 100. As indicated above, the heatsink 218 may assist in expelling heat away from the PCB 220. Thermal pads 222 may adjoin or abut components of the PCB 220 to the heatsink 218. In addition, conductive pads 224 may be included to for electrically ground components of the voice controlled assistant 100.

In some examples, one or more radial seals may be positioned adjacent to the light ring 120. Accordingly, when the top portion 108 is placed within a sleeve, the radial seal may encapsulate components within the top portion 108 and/or underneath the top cover 118.

A flexible printed circuit board (FPCB) 226 may connect processing between the top portion 108 and a bottom portion (not shown) of the housing 102. In some instances, the FPCB 226 or may provide signals to a loudspeaker residing within the top portion 108. For instance, in some examples, processing may be carried out on the PCB 204, 220 residing with a top half of the top portion 108. Therein, the FPCB 226 may electronically connect the electrical components to other hardware located in a bottom half of the top portion 108, such as a loudspeaker. Yet still, the FPCB 226 may link components residing within the bottom portion of the housing 102 (not shown).

Figure 3:
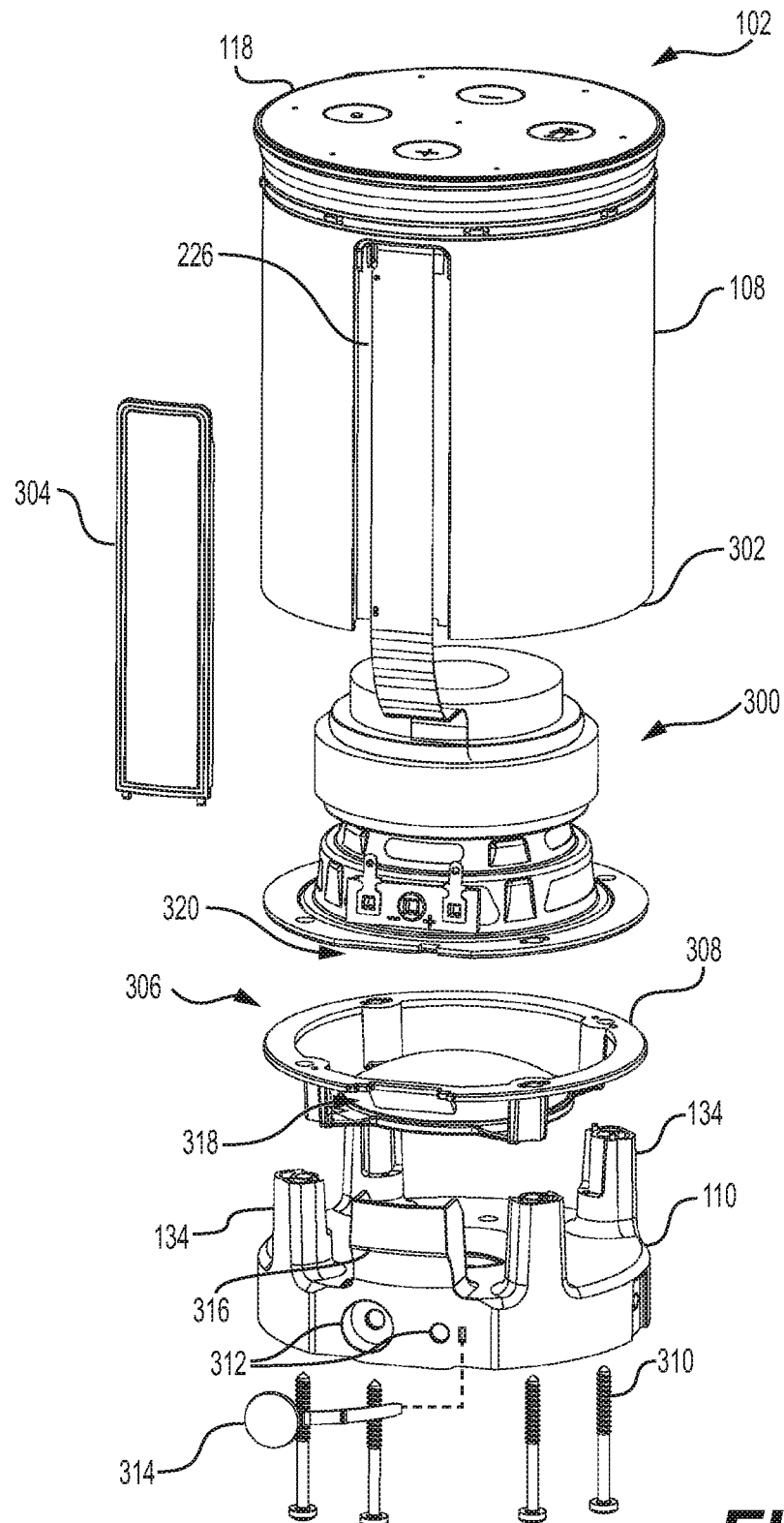
FIG. 3 illustrates a partial exploded view of an example voice controlled assistant, showing internal components residing within a top portion of a housing.

FIG. 3 illustrates a partial exploded view of the housing 102, showing details of the top portion 108 and the bottom portion 110.

The top portion 108 may include an internal cavity to allow a loudspeaker 300 to position within the top portion 108. In some instances, the loudspeaker 300 may output low and/or mid-range frequencies (e.g., woofer). In some instances, the internal cavity may provide back volume when the loudspeaker 300 is outputting sound. When the housing 102 is assembled, the loudspeaker 300 may fit within the internal cavity of the top portion 108, and rest along a bottom rim 302 of the top portion 108, creating a flush finish.

The flexible printed circuit board (FPCB) 226 may link loudspeakers (e.g., the loudspeaker 300) or drivers positioned within the internal cavity of the top portion 108 to printed circuit boards located in a separate region of the top portion 108, as discussed above with regard to FIG. 2. In addition, the FPCB 226 may provide power to microphones, LEDs, PCBs, etc., included under the top cover 118 of the top portion 108. A FPCB cover 304 may conceal the FPCB 226 to protect and retain the FPCB 226 within close proximity to the top portion 108. The FPCB cover 304 may be a plastic material with a rubber seal, or grommet, surrounding a perimeter thereof.

In some instances, an audio diffuser 306 may be interposed between the top portion 108 and the bottom portion 110, so as to rest within a space between the top portion 108 and the bottom portion 110. As mentioned hereinabove, the audio diffuser 306 may help direct sound outward and away from the voice controlled assistant 100. The audio diffuser 306 may have an audio diffuser frame 308 to position and support the audio diffuser 306. Additional details of the audio diffuser 306 are discussed later in FIG. 5B.

In some instances, the space occupied by the audio diffuser 306 may come by way of the plurality of legs 134 spanning between the top portion 108 and the bottom portion 110. More particularly, the plurality of legs 134 may act as standoff between the top portion 108 and the bottom portion 110. In some instances, and as shown in FIG. 3, the plurality of legs 134 may extend from the bottom portion 110. In addition, the plurality of legs 134 may attach the top portion 108 with the bottom portion 110.

Screws or other fasteners 310 may connect the top portion 108 and the bottom portion 110. In some instances, the screws 310 may be disposed through the plurality of legs 134. However, the top portion 108 and the bottom portion 110 may be secured to one another through alternate means, including adhesive, being snapped together, etc.

The bottom portion 110 may have ports 312 for connecting the voice controlled assistant 100 to a power source. In some instance, other input/output ports may be included, such as an auxiliary or USB port. Cover(s) 314 may be attached to the bottom portion 110 and serve to plug or otherwise occupy input/output ports when not in use.

In some instances, power supplied to the bottom portion 110, via the port 312, may be routed to the top portion 108 of the housing 102. Power may be configured to route through a foot 316 disposed on the bottom portion 110. In some instances, the foot 316 may be one of the plurality of legs 134 or may be embodied as a separate feature.

More particularly, to supply the power, when the bottom portion 110 is assembled to the top portion 108 (e.g., the screws 312), the foot 316 may traverse a hole 318 in the audio diffuser frame 308, so as to connect with contacts 320 within the top portion 108. Accordingly, the FPCB 226 may transmit power to the LEDs 210 and the microphones 206, for instance. In some instances, in addition to power being supplied through the foot 316, processing done within the bottom portion 110 may also be routed through the foot 316.

Figure 4:
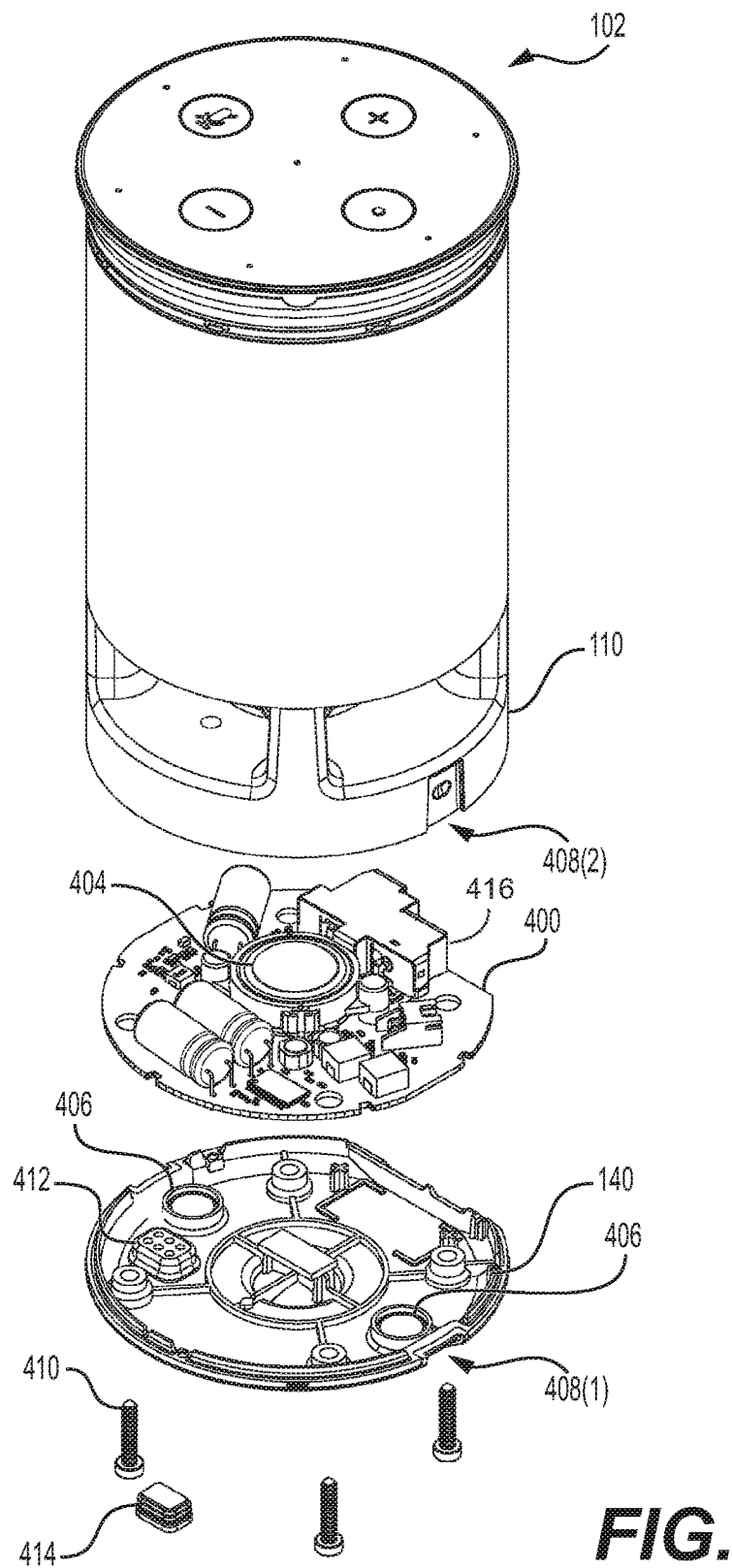
FIG. 4 illustrates a partial exploded view of an example voice controlled assistant, showing internal components residing in a bottom portion of a housing.

FIG. 4 illustrates a perspective and exploded view of the housing 102 having the bottom portion 110. Situated within or connected to the bottom portion 110 may be a printed circuit board (PCB) 400 and a base cover 140. The PCB 400 may have a similar or different hardware as mentioned herein above with regards to the PCB 204, 220 of FIG. 2.

A loudspeaker 404 may reside on the PCB 400 and may be directed to output sound towards an outlet disposed through a top surface of the bottom portion 100 (not shown). As discussed previously, the loudspeaker 404 may be oriented towards the top portion 108 of the voice controlled assistant 100 and/or the audio diffuser 306 positioned adjacent to the bottom portion 110. In some instances, the loudspeaker 404 may output sounds towards other loudspeakers included in the housing 102, such as the loudspeaker 300 residing within the top portion 108 of the housing 102. In some instances, the loudspeaker 404 may be designed to output high frequencies (e.g., tweeter).

A power plug 416 may also reside on the PCB 400. The power plug 416 may receive AC from a mains power supply and convert it into DC, so as to supply power to components of the voice controlled assistant 100, such as the PCB 400 and the loudspeaker 404, for instance.

Additionally, to secure the housing 102 to the sleeve 104, an attachment mechanism, such as magnetic elements 406 may be included on the housing 102 and/or the sleeve 104 to secure the housing 102 in the sleeve 104 and prevent inadvertent removal of the sleeve 104 during use. The magnetic elements 406 may be positioned on a surface of the housing 102 in contact with the base end 112 of the sleeve 104, such as the base cover 140. In some instances, the magnetic elements 406 may include magnets or ferrous metals. The magnetic elements 406 may engage with magnetic elements on the sleeve 104 into which the housing 102 is placed. The magnetic elements 406 on the housing 102 and the sleeve 104, when engaged, may secure the housing 102 and the sleeve 104 together. In some examples, the magnetic elements 406 may reside within the alignment elements 128, 408(1)(2).

The base cover 140 and/or the bottom portion 110 may include alignment elements 408(1)(2). For instance, as shown in FIG. 4, the alignment elements 408(1) may be on a bottom surface of the base cover 140. The alignment elements 408(2) may extend partially up an exterior surface of the bottom portion 110. When the base cover 140 is connected to the bottom portion 110, for instance, through screws 410, the alignment elements 408(1) on the base cover 140 may align with the alignment elements 408(2) on an exterior of the bottom portion 110. Yet still, the alignment elements 408(2) may extend partially or completely up an exterior of the housing 102 (not shown). The alignment elements 408(1)(2) may be positioned to engage with corresponding elements on an interior surface of a sleeve into which the housing 102 is placed.

The base cover 140 may also include an access port 412 and a corresponding access port plug 414, or cap, that covers the access port 412 when not in use. For instance, the access port 412 may be used to install updates or test software/hardware components.

Figure 5A:
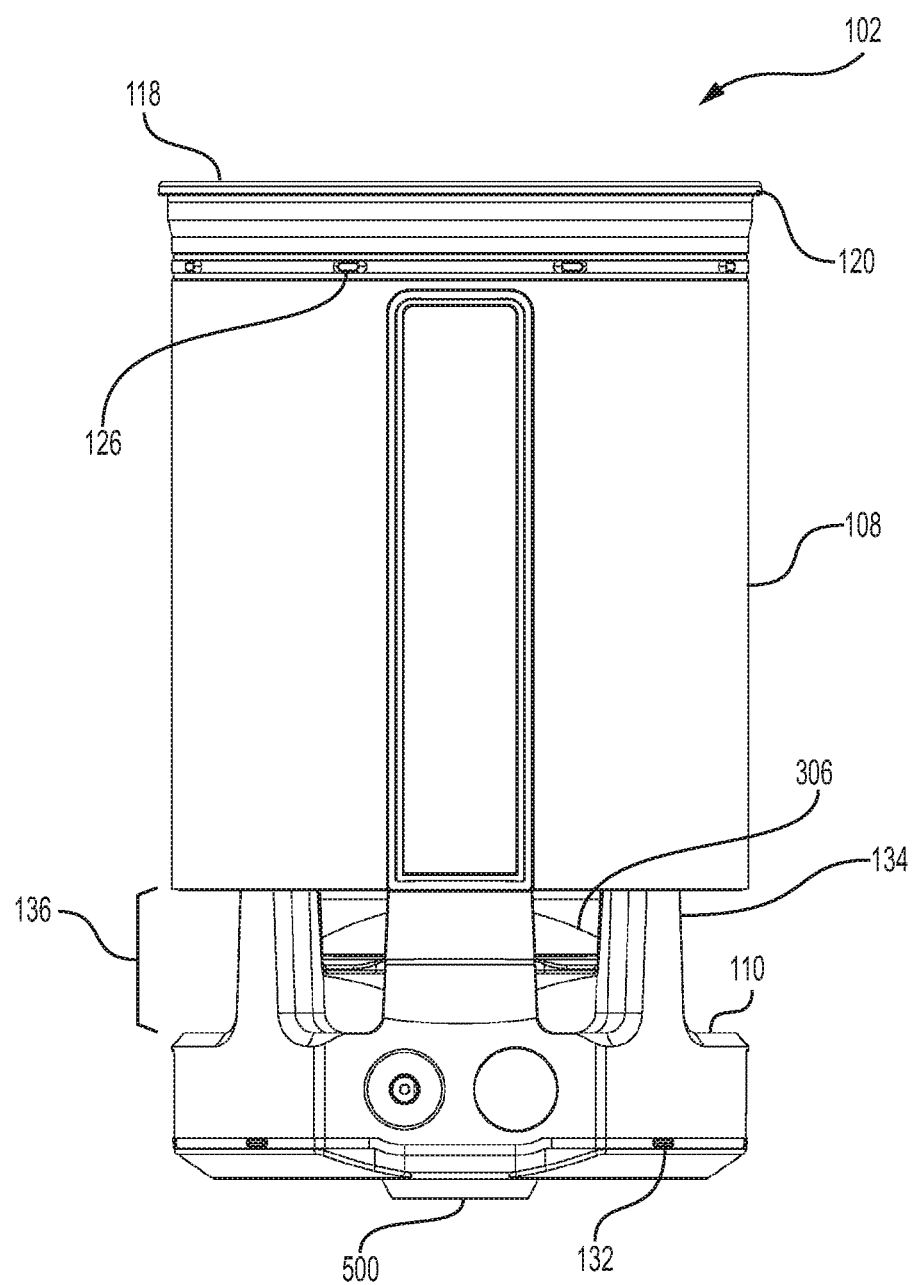
FIG. 5A illustrates a side view of an example voice controlled assistant, showing an audio diffuser interposed between a top portion and a bottom portion of a housing.
Figure 5B:
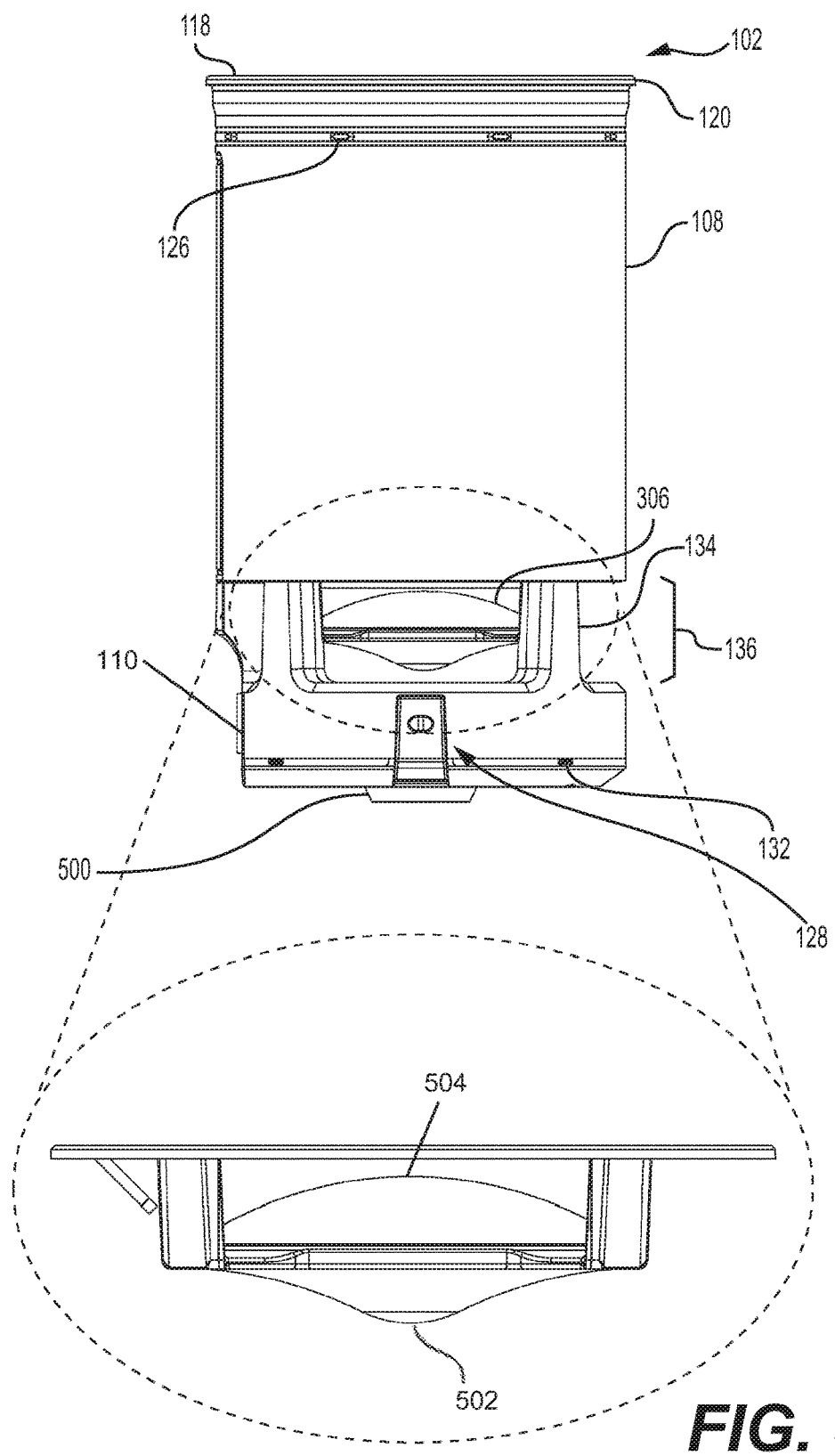
FIG. 5B illustrates a side view of an example voice controlled assistant, showing a close up of an audio diffuser interposed between a top portion and a bottom portion of a housing.

FIGS. 5A and 5B illustrate the housing 102 having the top portion 108 and the bottom portion 110. The top portion 108 may be connected to the bottom portion 110 through the plurality of legs 134. The plurality of legs 134 may create the gap 136 between the top portion 108 and the bottom portion 110 within which the audio diffuser 306 may be placed.

The audio diffuser 306 may be designed to radially emit sound produced by loudspeakers residing with the top portion 108 and the bottom portion 110, respectively. In some instances, the loudspeakers may be oriented to point towards the audio diffuser 306. The loudspeakers within the top portion 108 and the bottom portion 110, as well as the audio diffuser 306, may be aligned, for instance, through a centerline.

The audio diffuser 306 may take a plurality of shapes. For instance, the audio diffuser 306 may be, convex, concave, dome-shaped, bell-shaped, or any combination thereof. Opposing sides of the audio diffuser 306 may have a similar or different shape. In some instances, halves or portions of the audio diffuser 306 may be welded together (e.g., sonically). The audio diffuser frame 308 may position the audio diffuser 306 within the gap 136 (not shown). The audio diffuser 306 may have a plurality of surface finishes, such as being textured, polished, brushed, or smoothed. Accordingly, since portions of the audio diffuser 306 may be visible between adjacent or neighboring legs of the plurality of legs 134, through the gap 136, when the housing 102 is separated from the sleeve (104 of FIG. 1), the audio diffuser 306 may have a cosmetic appearance.

As shown in FIG. 5B, in some instances, a bottom half of the audio diffuser 306 facing a loudspeaker in the bottom portion 110 of the housing 102 may resemble a bell-shaped appearance with an apex 502. Additionally, or alternatively, a top half of the audio diffuser 306 facing a loudspeaker in the top portion 108 of the housing 102 have a dome-shaped appearance with a crown 504. In some instance, the apex 502 and the crown 504 may be centered along a centerline.

As the voice controlled assistant 100 according to this application may be designed to have a seamless appearance, when the housing 102 is slid into the sleeve 104, it may be difficult to separate the housing 102 from the sleeve 104. To assist in removal, a plug 500, or other extrusion, may be included on the bottom portion 110. The plug 500 may fit within an opening on a base end of the sleeve 104 that engages with the housing 102 (not shown). When removing the housing 102 from the sleeve 104, for instance, when a difference appearance state is desired, a user may press on the plug 500 so as to expose part of the top portion 108 above the sleeve 104 into which the housing 102 resides. Pressing/pushing the plug 500 may allow a user to grasp the top portion 108, for instance, the top cover 118 and/or the light ring 120, which may be otherwise incapable of grasping when the housing 102 is positioned within the sleeve 104. Stated differently, pressing the plug 500 may expose part of the top portion 108 above the annulus 116 of sleeve 104 (not shown). As discussed in more detail herein, a base end of the sleeve 104 engaged with the housing 102 may have an opening through which the plug 500 may partially or completely occupy. Given the interaction between the plug 500 and a corresponding opening in the sleeve 104, a user may find it easy to alter an appearance of the voice controlled assistant 100. The plug 500 may also include an indentation to receive a finger of the user.

As discussed in FIG. 2, the top portion 108 may include the light ring 120 that surrounds a portion thereof. In some instances, the light ring 120 may be disposed adjacent to the top cover 118 or under a lip of the top cover 118. The protrusions 126, 132 may reside on an exterior surface of the top portion 108 and the bottom portion 110, respectively. In addition, the alignment elements 520 may be disposed on the bottom portion 110 to align the housing 102 within the sleeve 104. The bottom portion 110 may also include input/output ports, such as a power connection, auxiliary connection, etc.

Figure 6A:
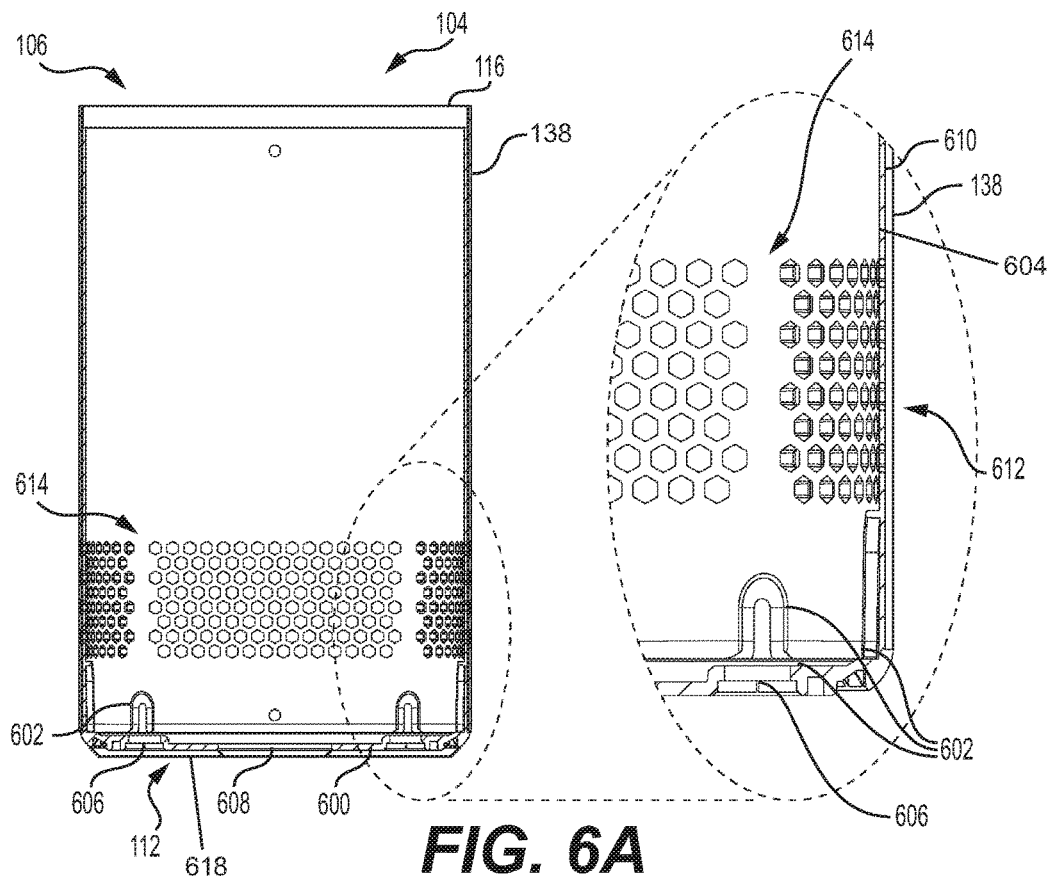
FIG. 6A illustrates a cross-sectional view of a sleeve corresponding to an example voice controlled assistant.
Figure 6B:
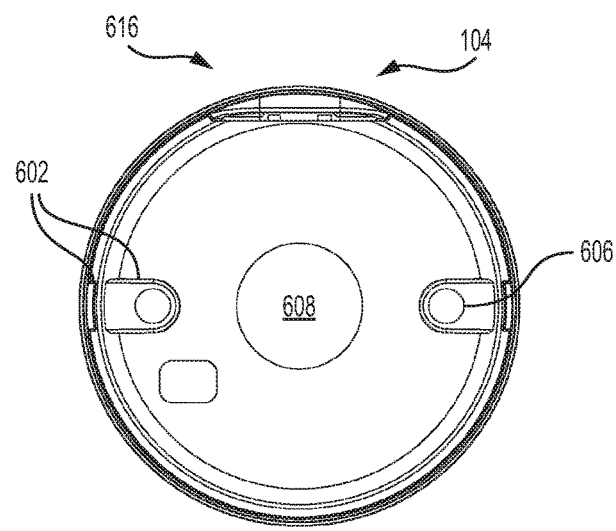
FIG. 6B illustrates a top view of a sleeve corresponding to an example voice controlled assistant.

FIGS. 6A and 6B illustrate various details of the sleeve 104. Particularly FIG. 6A illustrates a cross-sectional view of the sleeve 104 while FIG. 6B illustrates a top view of the sleeve 104, looking into a cavity thereof.

The sleeve 104 may include the open end 106 and the partially enclosed base end 112. The open end 106 may provide an aperture through which the housing 102 is placed into the sleeve 104. The open end 106 may also have the annulus 116 designed to engage with a lip or surface of the housing 102.

The partially enclosed base end 112 may be designed to engage with a bottom surface of the housing 102 when inserted into the sleeve 104. For instance, the housing 102 may rest on surface 600 of the partially enclosed base end 112. To align and situate the housing 102 within the sleeve 104, alignment elements 602 may be disposed along the surface 600 of the partially enclosed base end 112. In some instances, and as shown, the alignment elements 602 may extend up an interior surface 604 of the sleeve 104. The alignment elements 602 may engage with the corresponding alignment elements 130 on the housing 102.

Magnetic elements 606 may be included on the sleeve 104 to engage corresponding magnetic elements located on the housing 102. In some instances, and as shown in FIGS. 6A and 6B, the magnetic elements 606 may be situated within or otherwise integrated with the alignment elements 602.

The partially enclosed base end 112 may be partially enclosed in that an opening 608 may extend therethrough. The opening 608 may be centered within the sleeve 104 and may be designed to receive the plug 500 located on the bottom portion 110 of the housing 102, for instance, as shown and discussed in FIGS. 5A and 5B. In some instances, when the housing 102 is placed within the sleeve 104, the plug 500 may be partially or completely pass through the opening 608.

The grill 138 may wrap or surround all of a portion of an outer surface of the sleeve 104. In some instances, the voice controlled assistant 100 may take a plurality of appearances through interchanging the sleeve 104 and/or the grill 138.

The grill 138 may comprise a plurality of materials including plastic, metals, wood-veneer, knitted fabric, leather, or a mesh. In addition, the plurality of materials may include various colors. In some instances, the grill 138 may be a seamless material installed by sliding a tube of the material over the sleeve 104. In some instances, the grill 138 may have an open top and bottom ends, resembling a tube, that allows the grill 138 to wrap over the sleeve 104. In such instances, a top end of the material may be folded over (e.g., wrapped, tucked, etc.) the annulus 116 and compressed between the sleeve 104 and the housing 102, when placed within the sleeve 104. In some instances, the top cover 118, as discussed in FIG. 2, may pin the material against the sleeve 104 to hold the material in place. Alternatively, or additionally, an adhesive may be positioned between the material and the interior surface 604 of the sleeve 104. By folding the material over the sleeve 104 and holding the material in place using the top portion 108 of the housing 102, the ends of the material may be hidden from external view. In some instances, such as a grill having wood-veneer finish, the veneer may resemble a cylindrically shaped material that may slide over an exterior surface 610 of the sleeve 104.

In FIG. 6A, the sleeve 104 may include openings 612 positioned around all or part of a circumference of the sleeve 104. The openings 612 may provide space for sound emitted by loudspeakers in the housing to pass-through. In some instances, when the housing 102 is placed within the sleeve 104, the openings 612 may be both near (e.g., vertically and/or horizontally) or adjacent to the audio diffuser 306 of the housing 102. That is, as discussed above, when the housing 102 is inserted into the sleeve 104, the audio diffuser 306 may align with a centerline of the openings 612. Additionally, the openings 612 may be omitted from an area 614 on the sleeve 104 next to the plurality of legs 134 of the housing 102.

In some instances, the openings 612 may take a patterned look and may resemble a plurality of shapes, including being circular, square, hexagonal, or any combination thereof.

A slot 616 may be included in the sleeve 104 to allow internal components of the housing 102, such as those within the bottom 110 portion, to receive external connections (e.g., power or auxiliary).

In some instances, a rubber foot 618 may attach to the bottom surface 600 of the sleeve 104. The rubber foot 618 may surround a perimeter of the bottom surface 600 or may partially or completely adjoin to the bottom surface 600.

Figure 7A:
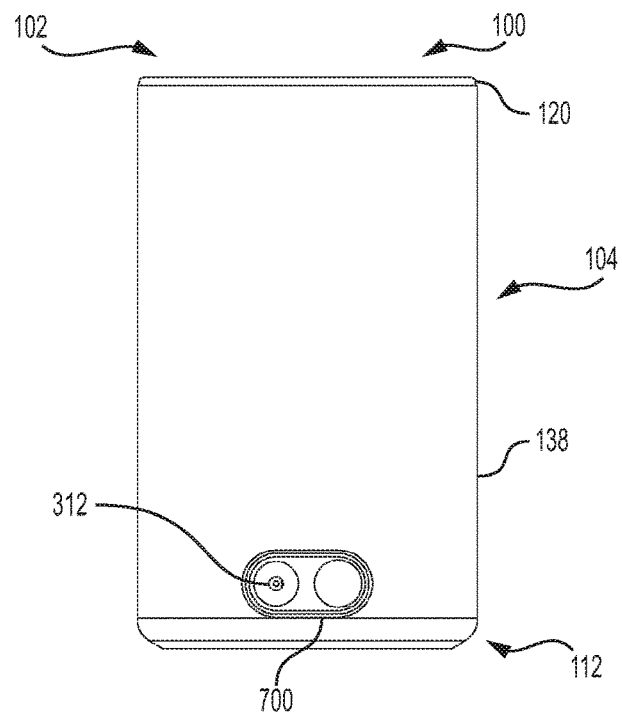
FIG. 7A illustrates a rear view of an example voice controlled assistant.

FIG. 7A illustrates a rear view of the voice controlled assistant 100, having the housing 102 engaged within the sleeve 104. In some instances, the housing 102 may engage with the sleeve 104 so as to resemble a flush seamless appearance.

When the housing 102 is inserted into the sleeve 104, the light ring 120 may be exposed above the annulus 116 of the open end 106 of the sleeve 104. As mentioned previously herein, the light ring 120 may serve to identify functions performed by the voice controlled assistant 100. Additionally, when the housing 102 is inserted into the sleeve 104, internal components of the housing 102, such as the port 312, may be exposed through a slot 700 included in the sleeve 104. The bottom portion 108 of the housing 102 (not shown) may rest or engage with an interior surface on the base end 112 of the sleeve 104.

The grill 138 may surround an exterior surface of the sleeve 104 so as to give the voice controlled assistant 100 varying appearances. In some examples, the grill 138 may be a fabric comprising a seamless tube of material.

Figure 7B:
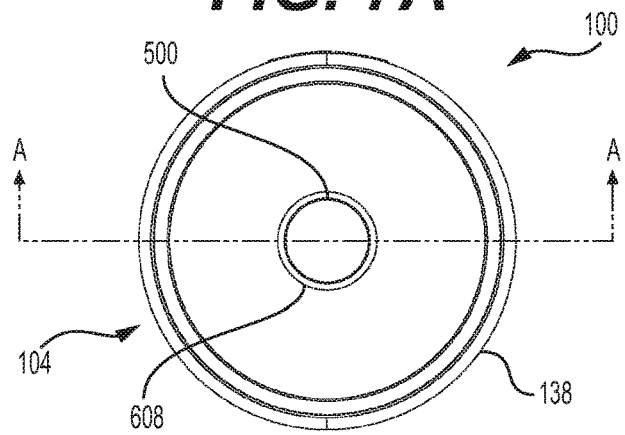
FIG. 7B illustrates a bottom view of an example voice controlled assistant.

FIG. 7B illustrates the voice controlled assistant 100 having the opening 608 included through the base end 112 of the sleeve 104. The opening 608 may assist when separating the housing 102 from the sleeve 104, such as when a user presses on the plug 500. As shown, the grill 138 may surround or wrap an exterior of the sleeve 104.

Figure 7C:
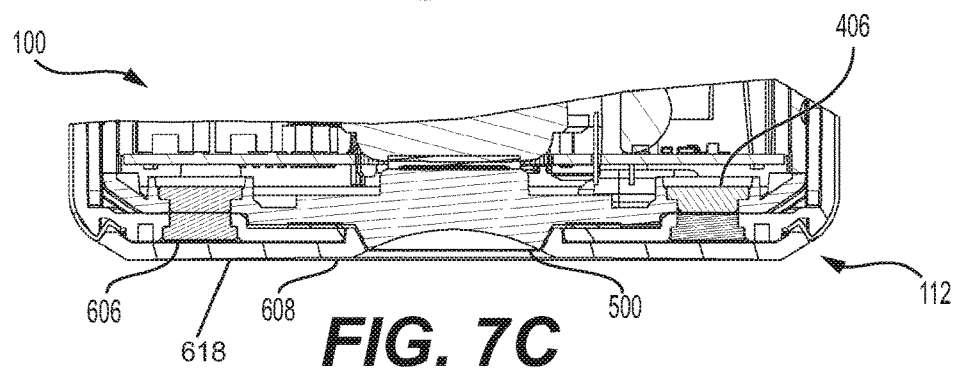
FIG. 7C illustrates a cross-sectional view of an example voice controlled assistant, showing a housing engaged with a sleeve.

FIG. 7C illustrates a partial cross-section of the voice controlled assistant 100, taken along line A-A of FIG. 7B. More particularly, section A-A, shows the interaction between the plug 500 disposed on the bottom portion 110 of the housing 102 engaged, partially resting within, or extending through or into the opening 608 on the base end 112 of the sleeve 104. Section A-A also shows the magnetic elements 606 on the base end 112 of the sleeve 104 engaging with the magnetic elements 406 on the bottom portion 110 of housing 102. Also shown in FIG. 7C is the rubber foot 618 disposed on or around a bottom surface of the based end 112 of the sleeve 104.

CONCLUSION

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An audio device comprising:
    a cylindrical housing including:
        a top portion having an exterior surface;
        a bottom portion having an exterior surface;
        a first loudspeaker disposed within the top portion of the cylindrical housing, the first loudspeaker oriented to emit sound towards the bottom portion of the cylindrical housing;
        a second loudspeaker disposed within the bottom portion of the cylindrical housing, the second loudspeaker oriented to emit sound towards the top portion of the cylindrical housing;
        an audio diffuser positioned between the top portion of the cylindrical housing and the bottom portion of the cylindrical housing, the audio diffuser interposed between the first loudspeaker and the second loudspeaker to diffuse sound radially outward from the cylindrical housing;
        a first plurality of protrusions positioned around the exterior surface of the top portion of the cylindrical housing; and
        a second plurality of protrusions positioned around the exterior surface of the bottom portion of the cylindrical housing; and
    a cylindrical sleeve including:
        a partially enclosed base end;
        an open end;
        a cylindrical wall extending between the partially enclosed base end and the open end, the cylindrical wall having an interior surface and an exterior surface; and
        multiple openings extending through the cylindrical wall positioned proximate to the partially enclosed base end.

2. The audio device of claim 1, further comprising:
    an alignment element disposed on the interior surface of the cylindrical wall of the cylindrical sleeve;
    a first magnetic element disposed on the partially enclosed base end of the cylindrical sleeve or the interior surface of the cylindrical wall of the sleeve;
    an indentation disposed on an exterior surface of the bottom portion of the cylindrical housing and configured to engage with the alignment element; and
    a second magnetic element disposed on the exterior surface of the bottom portion of the cylindrical housing and configured to engage with the first magnetic element.

3. The audio device of claim 1, further comprising:
    an opening extending through the partially enclosed base end of the cylindrical sleeve; and
    a plug located on the bottom portion of the cylindrical housing, the plug resting within the opening and extending into or at least partially through the opening.

4. The audio device of claim 1, wherein the audio diffuser includes:
    a convex dome oriented with an apex of the convex dome towards the first loudspeaker; and
    a bell-shaped portion oriented with an apex of the bell-shaped portion towards the second loudspeaker.

5. The audio device of claim 1, further comprising at least one of:
    a first plurality of depressions disposed on the interior surface of the cylindrical sleeve, wherein each first depression of the first plurality of depressions is positioned to align with a corresponding protrusion of the first plurality of protrusions; or
    a second plurality of depressions disposed on the interior surface of the cylindrical sleeve, wherein each second depression of the second plurality of depressions is positioned to align with a corresponding protrusion of the second plurality of protrusions.

6. An electronic device comprising:
    a housing including:
        a top portion having an exterior surface;
        a bottom portion having an exterior surface;
        first protrusions extending radially outward from a perimeter of the top portion of the housing; and
        second protrusions extending radially outward from a perimeter of the bottom portion of the housing; and
    a sleeve including:
        a partially enclosed base end;
        an open end; and
        a wall extending between the partially enclosed base end and the open end, the wall having an interior surface and an exterior surface.

7. The electronic device of claim 6, further comprising at least one of:
    first depressions disposed on the interior surface of the wall, wherein each first depression of the first depressions is configured to engage with a corresponding protrusion of the first protrusions; or
    second depressions disposed on the interior surface of the wall, wherein each of the second depressions is configured to engage with a corresponding protrusion of the second protrusions.

8. The electronic device of claim 6, further comprising:
    at least one first alignment element disposed on at least one of the partially enclosed base end or the interior surface of the wall; and
    at least one second alignment element disposed on at least one of the bottom portion of the housing or the exterior surface of the bottom portion, wherein the at least one second alignment element is configured to engage the at least one first alignment element.

9. The electronic device of claim 6, wherein the sleeve includes a grill surrounding at least a portion of the exterior surface of the sleeve, and wherein the grill comprises fabric, plastic, wood, or a combination thereof.

10. The electronic device of claim 6, further comprising:
    at least one first magnetic element positioned on the partially enclosed base end of the sleeve; and
    at least one second magnetic element positioned on the bottom portion of the housing, the at least one second magnetic element configured to engage with the at least one first magnetic element.

11. The electronic device of claim 6, further comprising:
at least one first alignment element disposed on at least one of the partially enclosed base end or the interior surface of the wall;
at least one first magnetic element disposed on the at least one first alignment element;
at least one second alignment element disposed on the exterior surface of the bottom portion, wherein the at least one second alignment element is configured to engage the at least one first alignment element; and
at least one second magnetic element disposed within the at least one first alignment element, the at least one second magnetic element configured to engage with the at least one first magnetic element.

12. The electronic device of claim 6, further comprising:
an opening extending through the partially enclosed base end; and
a plug positioned on the bottom portion of the housing, wherein the plug extends into or at least partially through the opening.

13. The electronic device of claim 6, further comprising a light ring disposed around the top portion of the housing between an annulus of the open end of the sleeve and a lip around the top portion of the housing.

14. The electronic device of claim 6, further comprising an audio diffuser interposed between the top portion of the housing and the bottom portion of the housing.

15. The electronic device of claim 14, wherein the audio diffuser comprises:
a first portion having a dome shape directed towards a top of the electronic device; and
a second portion having a bell shape directed towards a bottom of the electronic device.

16. The electronic device of claim 6, wherein the sleeve includes one or more orifices extending through at least a portion of the wall proximate to the partially enclosed base end.

17. The electronic device of claim 6, wherein the housing comprises a plurality of legs adjoining a bottom surface of the top portion and a top surface of the bottom portion, and wherein at least one gap is interposed between at least two adjacent legs of the plurality of legs.

18. The electronic device of claim 6, wherein:
the housing comprises a leg extending between the top portion and the bottom portion; and
the leg includes a channel through which one or more electrical connections are disposed, the one or more electrical connections connecting a first electrical component in the top portion with a second electrical component in the bottom portion.

19. The electronic device of claim 6, further comprising:
a first loudspeaker positioned within the top portion of the housing, the first loudspeaker oriented to emit sound toward the bottom portion of the housing; and
a second loudspeaker positioned within the bottom portion of the housing, the second loudspeaker oriented to emit sound toward the top portion of the housing.

20. The electronic device of claim 19, wherein at least one of:
the first loudspeaker comprises a woofer loudspeaker; or
the second loudspeaker comprises a tweeter loudspeaker.

* * * * *